Patented Oct. 27, 1931

1,829,583

UNITED STATES PATENT OFFICE

JOSEPH G. DAVIDSON, OF YONKERS, NEW YORK, AND ERNEST W. REID, OF PITTSBURGH, PENNSYLVANIA, ASSIGNORS TO CARBIDE AND CARBON CHEMICALS CORPORATION, A CORPORATION OF NEW YORK

PROCESS OF REMOVING FINISH COATINGS

No Drawing.   Application filed November 5, 1928.   Serial No. 317,477.

The invention relates to finish removers which, as is well known, are compositions intended for the removal of coatings produced with paint, lacquer, varnish, enamel or the like. A wide variety of substances are encountered in such coatings, including oxidized oils, natural and synthetic gums and resins, and cellulose esters. A finish remover should contain an active solvent for as many as possible of such substances; should not be so volatile as to evaporate before it has finished its work; and should be non-injurious to the user and to the materials from which coatings are to be removed.

We have found that benzene derivatives having side chains containing a plurality of carbon atoms possess the solvent properties and high boiling points desirable in finish-removing solvents. The ethyl benzenes, in which the side-chain or chains contain only two carbon atoms, give good results, but the propyl, isopropyl, butyl and higher alkyl benzenes are also included in the invention. There may of course be different alkyl groups present in the compound, as in the case of ethyl toluene. A benzene derivative of suitable boiling point for the work at hand may be selected from those available. Thus in the case of the ethyl benzenes the boiling point increases with the degree of ethylation from 135° C. for monoethyl benzene to about 300° C. for hexaethyl benzene.

In some cases, particularly where the finish to be removed contains a cellulose ester, it is desirable to include in the finish-removing composition a glycol derivative which is an ether. Among these derivatives we wish to mention specifically (a) the ethyl ether of ethylene glycol, $HOCH_2CH_2OC_2H_5$; (b) the acetate of the ethyl ether of ethylene glycol, $CH_3COOCH_2CH_2OC_2H_5$; (c) tripropylene glycol, $HOC_3H_6OC_3H_6OC_3H_6OH$; (d) the homologues of compounds (a) (b) and (c); and (e) the ethers and esters which are related to the polyglycols in the same way that compounds (a) and (b) are related to the simple glycols. It will be noted that all the compounds enumerated above contain at least one ether linkage. They are, generally speaking, solvents for cellulose esters, have suitable boiling points for use in finish removers, and are free from objectionable odor.

We have also discovered that the solvent action of such liquids as those mentioned above is often enhanced to a remarkable degree by the presence of a small proportion of an hydroxyalkyl amine. The ethanol amines or hydroxyethyl amines are examples of this class. They may be prepared, as is known, by the action of ethylene oxide on ammonia. One, two, or three hydroxyalkyl groups may unite with an ammonia molecule, for example

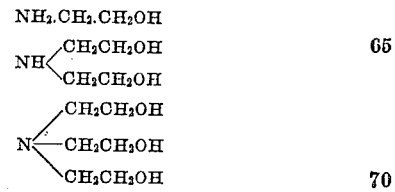

Any of the foregoing may be used as well as the corresponding derivatives of other alcohols. The latter may be produced by using another olefine oxide in place of the ethylene oxide. Instead of the hydroxyalkyl amines, we may use their salts or esters, for example the oleates and stearates.

The complete finish remover may of course contain any of the usual diluents, or cheaper and less active solvents, or additions for modifying the volatility, color, odor or other property. Ethanol is a typical auxiliary solvent often used and is a useful addition to many of the compositions of my invention. The addition of a wax, for example 1% to 5% of paraffine, ozokerite, or beeswax, may be employed to diminish the fluidity of the composition. The wax may be dissolved in the aromatic hydrocarbon constituent by heating and stirring, and the solution, preferably after cooling, may be mixed with the other ingredients.

The following specific mixtures have given good results:

I. Ethyl benzene 27%, ethanol 27%, butyl ether of ethylene glycol 14%, triethanol amine 5%, acetate of ethyl ether of ethylene glycol 27%.

II. Ethyl benzene 46%, ethanol 48% triethanol amine 6%.

III. Mixture of alkyl benzenes consisting chiefly of ethyl and isopropyl benzenes 55%, ethanol 42%, triethanol amine 3%.

Our preferred compositions contain 10% to 75% of benzene derivative having a side chain with a plurality of carbon atoms. They may also contain 5% to 75% of ether glycol derivative, and 1% to 10% of hydroxyalkyl amine, and may or may not contain diluents and auxiliary solvents.

We claim:—

1. In a process of removing finish coatings from surfaces, the step of disintegrating the coating by attacking an organic constituent thereof with a solvent containing an ethanolamine and ethyl benzene.

2. In a process of removing finish coatings from surfaces, the step of disintegrating the coating by attacking an organic constituent thereof with a solvent containing an ethanol amine and an alkyl benzene having a side chain with a plurality of carbon atoms.

3. In a process of removing finish coatings from surfaces, the step of disintegrating the coating by attacking an organic constituent thereof with a solvent containing an ethanol amine, a glycol ether, and an alkyl benzene having a side chain with a plurality of carbon atoms.

In testimony whereof, I affix my signature.
JOSEPH G. DAVIDSON.
In testimony whereof, I affix my signature.
ERNEST W. REID.